(12) United States Patent
Marchenko et al.

(10) Patent No.: US 9,379,989 B2
(45) Date of Patent: Jun. 28, 2016

(54) CONGESTION AVOIDANCE AND CONTROL FOR UDP-BASED PROTOCOLS

(71) Applicant: EMC Corporation, Hopkinton, MA (US)

(72) Inventors: Roman Vladimirovich Marchenko, St. Petersburg (RU); Ivan Vladimirovich Andreyev, St. Petersburg (RU); Alexander Valeryevich Romanyukov, Leningradskaya obl. (RU)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/236,273

(22) PCT Filed: Mar. 15, 2013

(86) PCT No.: PCT/IB2013/001084
§ 371 (c)(1),
(2) Date: Aug. 25, 2014

(87) PCT Pub. No.: WO2014/140673
PCT Pub. Date: Sep. 18, 2014

(65) Prior Publication Data
US 2014/0369195 A1    Dec. 18, 2014

(51) Int. Cl.
*H04L 12/841* (2013.01)
*H04L 12/803* (2013.01)
*H04L 12/801* (2013.01)
*H04L 12/825* (2013.01)

(52) U.S. Cl.
CPC .......... *H04L 47/283* (2013.01); *H04L 47/125* (2013.01); *H04L 47/16* (2013.01); *H04L 47/25* (2013.01)

(58) Field of Classification Search
None
See application file for complete search history.

(56) References Cited

U.S. PATENT DOCUMENTS

| | | | |
|---|---|---|---|
| 2005/0021830 A1* | 1/2005 | Urzaiz | H04L 47/10 709/234 |
| 2006/0039295 A1* | 2/2006 | Sturrock | H04L 47/10 370/252 |
| 2010/0215053 A1 | 8/2010 | Chakareski et al. | |
| 2010/0274871 A1 | 10/2010 | Harrang et al. | |

* cited by examiner

*Primary Examiner* — Ian N Moore
*Assistant Examiner* — Lakeram Jangbahadur
(74) *Attorney, Agent, or Firm* — BainwoodHuang

(57) ABSTRACT

An improved technique involves avoiding congestion in a network by monitoring round trip times of data units sent from a node of the network. Along these lines, a controller at a node of the network sends data units at some transmission rate to a target node with instructions to send a response back to the home node. Upon receiving the response, the controller measures the round-trip time as the difference in time from sending of the message to receipt of the response. Based on the round-trip time, the controller sets a new transmission rate at which to send units of data.

18 Claims, 5 Drawing Sheets

CONGESTION AVOIDANCE AND CONTROL FOR UDP-BASED PROTOCOLS

BACKGROUND

In a network, network congestion occurs when a link or node is carrying so much data that its quality of service deteriorates. Typical effects include queuing delay, packet loss, or the blocking of new connections.

In order to minimize network congestion, network congestion avoidance systems attempt various control and avoidance schemes. Along these lines, conventional approaches to network congestion avoidance involve monitoring dropped packets and timeouts in the network. For example, in a scheme known as additive increase multiplicative decrease (AIMD), a controller incrementally adds a constant amount to a data transmission rate at successive time steps until it detects dropped packets. When this detection occurs, the network congestion avoidance system decreases the transmission rate by a predetermined percentage, and begins the process anew. In this way, a network congestion avoidance system may gauge the optimal rate at which it may transmit data packets reliably.

SUMMARY

Unfortunately, there are deficiencies with the above-described conventional approaches to network congestion avoidance. For example, there is poor correlation between lost packets and congestion in a modern network. Along these lines, in networks that use maximum transmission units (MTUs) of data, transmission control protocol (TCP) tends to drop packets in the presence of an excessive number of MTUs despite a lack of congestion in the network. Furthermore, a criterion involving dropped packets is unsuitable for user datagram protocol (UDP), in which there is no guarantee that datagrams will be delivered.

In contrast to the conventional approaches to network congestion avoidance, an improved technique involves avoiding congestion in a network by monitoring round trip times of data units sent from a node of the network. Along these lines, a controller at a node of the network sends data units at some transmission rate to a target computer at another node of the network with instructions to send a response back to the home node. Upon receiving the response, the controller measures the round-trip time as the difference in time from sending of the message to receipt of the response. Based on the round-trip time, the controller sets a new transmission rate at which to send units of data.

It should be understood that, in some arrangements, the controller periodically sends units of data to the target computer over time. In this way, the controller adjusts transmission rate from the node of the network in response to observed round-trip times. Furthermore, in other arrangements, some of the units of data sent by the controller take the form of bursts of hundreds or thousands of data units. In this case, the target computer measures the difference in round-trip time between the lead data unit and the trailing data unit divided by number of datagrams as a burst delay, and sends the burst delay in a header of a response. The controller then bases new transmission rates on currently observed round-trip times and the burst delay.

Advantageously, by observing round-trip times of data units sent from a node of the network over time, the improved technique provides capability for robustly determining a rate of transmission over any protocol. For example, because this capability does not depend on monitoring dropped packets, the improved technique may be employed in protocols such as UDP in which dropped packets are not indicative of network abnormalities such as congestion. Consequently, the improved technique improves the performance of networks because it enables controllers to optimize transmission rate based on measurements that are relevant to indicators of congestion in modern networks.

One embodiment of the improved technique is directed to a method of avoiding congestion in a network. The method includes sending, from a sending computer, a first set of data units to a target computer in the network at a sending time, the first set of data units being sent at a first rate of transmission. The method also includes receiving, at the sending computer, a response to the first set of data units from the target computer at a receiving time after the sending time. The method further includes obtaining, at the sending computer, a round-trip time indicative of a difference between the receiving time and the sending time. The method further includes computing, at the sending computer, a second rate of transmission based on a factor that includes the round-trip time, the second rate of transmission serving to avoid congestion in the network. The method further includes sending, from the sending computer, a second set of data units to the target computer at the second rate of transmission.

Additionally, some embodiments of the improved technique are directed to a system constructed and arranged to avoid congestion in a network. The system includes a network interface, memory, and a controller including controlling circuitry constructed and arranged to carry out the method of avoiding congestion in a network.

Furthermore, some embodiments of the improved technique are directed to a computer program product having a non-transitory computer readable storage medium which stores code including a set of instructions which, when executed by a computer, cause the computer to carry out the method of avoiding congestion in a network.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique involves avoiding congestion in a network by monitoring round trip times of data units sent from a node of the network. Along these lines, a controller at a node of the network sends data units at some transmission rate to a target node with instructions to send a response back to the home node. Upon receiving the response, the controller measures the round-trip time as the difference in time from sending of the message to receipt of the response. Based on the round-trip time and the burst delay, the controller sets a new transmission rate at which to send units of data.

Advantageously, by observing round-trip times of data units sent from a node of the network over time, the improved technique provides capability for robustly determining a rate of transmission over any protocol. For example, because this capability does not depend on monitoring dropped packets, the improved technique may be employed in protocols such as UDP in which dropped packets are not indicative of network abnormalities such as congestion. Consequently, the improved technique improves the performance of networks because it enables controllers to optimize transmission rate based on measurements that are relevant to indicators of congestion in modern networks.

It should be understood transmission rate is defined as an average number of data units sent for unit of time.

Figure 1:
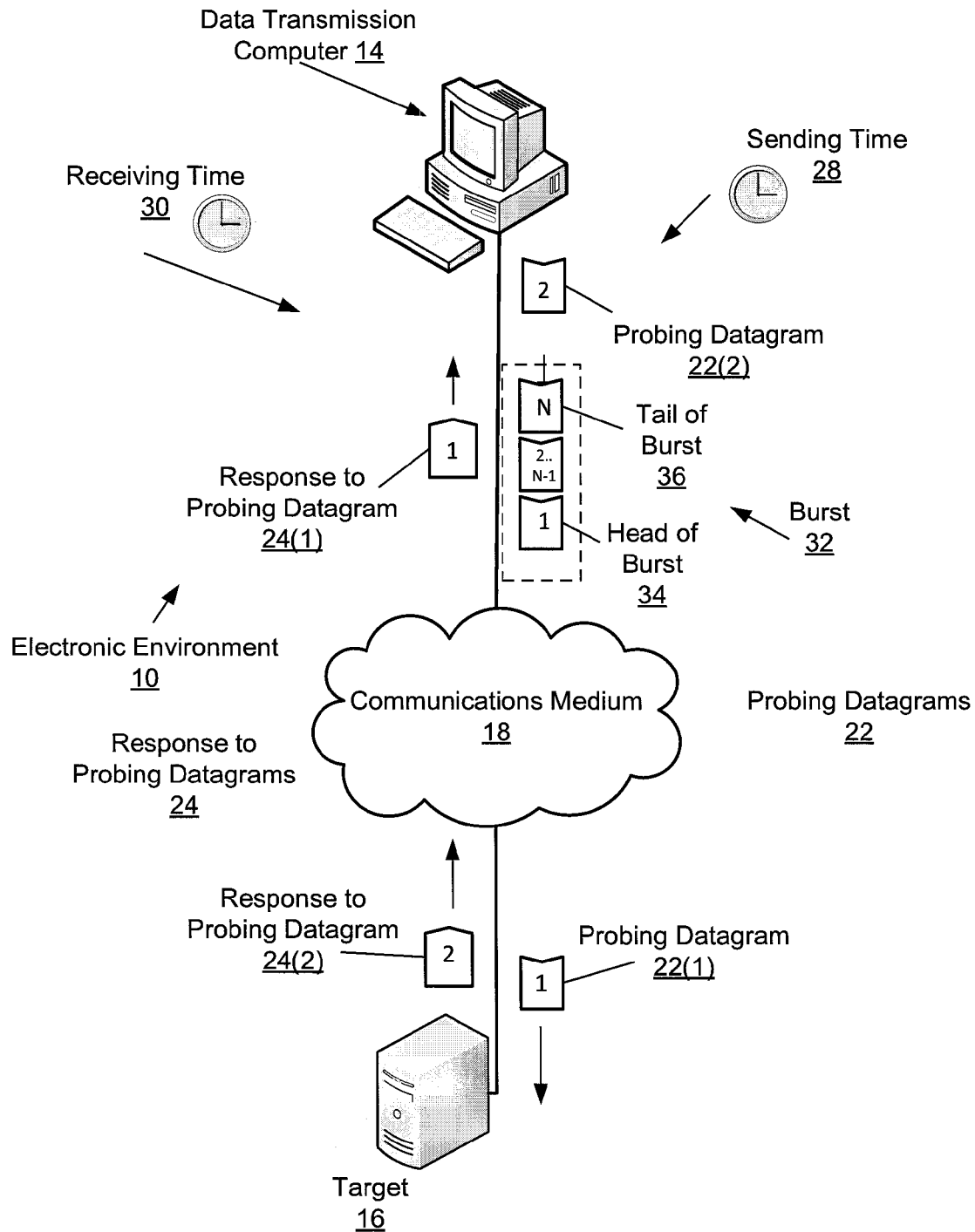
FIG. 1 is a block diagram illustrating an example electronic environment for carrying out the improved technique.

FIG. 1 illustrates an example electronic environment 10 for carrying out the improved technique. Electronic environment 10 includes data transmission computer 14, a target server 16, and a communications medium 18.

Communication medium 18 provides network connections between data transmission computer 14, and target server 16. Communications medium 18 may implement protocols such as IP, UDP, ATM, Ethernet, Fibre Channel, combinations thereof, and the like. Furthermore, communications medium 18 may include various components (e.g., cables, switches/routers, gateways/bridges, NAS/SAN appliances/nodes, interfaces, etc.). Moreover, the communications medium 18 is capable of having a variety of topologies (e.g., queue manager-and-spoke, ring, backbone, multi drop, point to-point, irregular, combinations thereof, and so on).

Data transmission computer 14 is constructed and arranged to send units of data 22 through communications medium 18 to target server 16. Data transmission computers 14 are also constructed and arranged to receive responses 24 to transmissions of data units 22 from target server 16, and measure a difference in time between sending the data units 22 and receiving corresponding responses. Data transmission computers 14 are further constructed and arranged to adjust the rate at which it transmits data to, for example, destination server 20, based on the measured difference in time. Data transmission computers 14 are personal computers, although in some arrangements, data transmission computers 14 may be a laptop computer, server, tablet computer, smartphone, or the like.

It should be understood that data units 22 may take the form of datagrams under UDP. For the purposes of discussion below, communications medium 18 operates under UDP. It should also be understood that each datagram 22 contains a maximum transmission unit (MTU) of data.

It should be further understood that datagram 22 represents a probe datagram that is used for purposes of monitoring and avoiding network congestion according to the improved technique, while on the other hand, datagrams in burst 32 may represent payload datagrams which contains actual content.

Target server 16 is constructed and arranged to receive transmissions from data transmission computers 14. Target server 16 is also constructed and arranged to send responses to the transmissions. In some arrangements, target server 16 is constructed and arranged to measure burst delay and write that burst delay in a header of a response. Target server 16 is a server, but in some arrangements target server 16 may be a personal computer or the like.

For the purposes of the example described below, it is assumed that communications medium 18 operates under UDP. In this case, units of data are datagrams.

During operation, a data transmission computer 14 sends a first datagram 22(1) to target 16 through communication medium 18 for the purpose of measuring the round-trip time (RTT), or the time it takes for a response 24 from target 16 to arrive at a data transmission computer 14. In some arrangements, in order that target 16 send a response to datagram 22(1), data transmission computer 14 includes a request in a header of that datagram 22(1) directing target 16 to send a response 24 to a data transmission computer 14. Data transmission computer 14 also includes the sending time 28 at which it sends datagram 22(1).

Data transmission computer 14 then receives a response 24 from target server 16 that corresponds to a datagram 22(1). In order that the received response 24(1) is identified with a particular datagram 22(1), the particular datagram 22(1) and response 24(1) include an identifier (not pictured) that uniquely identifies that datagram 22(1). The identifier includes sending time 28.

Upon receiving response 24(1), data transmission computer 14 compares the time response 24 was received to sending time 28 extracted from the header of response 24. Data transmission computer 14 then assigns the difference between the receive time and the send time as the RTT for datagram 22(1).

It should be understood that data transmission computer 14 is, in some arrangements, sending not just one datagram 22 to target 14, but a sequence of datagrams 22 at some transmission rate (i.e., periodically). Data transmission computer 14 then generates a series of RTT measurements from the responses 24 it receives which may be analyzed individually or as a group (e.g., as a moving average).

In some arrangements, data transmission computer 14 performs a median filtering operation on the computer RTT to produce a filtered value RTTf. Along these lines, data transmission computer 14 has a buffer (not pictured) in which some fixed number of previous RTT measurements is stored. Upon computing the current RTT, data transmission computer 14 erases the oldest of the stored RTT values from a place in the buffer and stores the current RTT value in that place in the buffer. Data transmission computer 14 sorts the largest half of the values stored in the buffer and selects the smallest value, i.e., the median value RTTf as the value of the RTT on which a new transmission rate will be based. An advantage of this filtering operation is that the transmission rate computation will be insensitive to outliers in RTT values.

In further arrangements, data transmission computer 14 also normalizes against a minimum RTT value, mRTT, which is derived by comparing RTTf against a current value of mRTT. In some arrangements, data transmission computer 14 generates a difference dRTTf between the RTTf and the current value of mRTT. When RTTf is less than the current value of mRTT, then the current value of mRTT is set equal to RTTf.

Data transmission computer 14 then generates a new transmission rate for sending datagrams 26 to destination server based on the measured RTT (or RTTf, or dRTTf). Further details of the generation of the new transmission rate are described below with respect to FIG. 3.

As will be discussed below with respect to FIG. 2 and FIG. 4, burst delay may also be a factor in determining how the transmission rate is adjusted. In some arrangements, data transmission computer 14 observes burst delay by generating bursts of datagrams 32, or a large group of datagrams sent out to target computer 16 within a short time period. In generating a burst for measuring burst delay, data transmission computer 14 sends datagrams 32 within such a burst of datagrams at a rate faster than the current rate of transmission to target computer 16. For example, a burst of datagrams may contain 100 times the number of datagrams sent out in a short amount of time at the current rate of transmission; generally, there may be as few as about 50 and as many as about 2,000 times the number of datagrams sent out in that short amount of time.

It should be understood that, in some arrangements, datagrams 22 and 32 contain a "header" within the payload area of the datagram in which a bit identifies a datagram as either a probing datagram or a data datagram. That bit in a probing datagram such as datagram 22(1) communicates to target computer 16 that it is a probing datagram and a response should imminently be sent back to its sending computer.

It should be understood that, in many arrangements, data transmission computer 14 sends burst 32 in between probing datagrams 22, say, datagrams 22(1) and 22(2). Upon receipt, target computer 16 measures the time difference between a leading burst datagram 34 and a trailing burst datagram 36. Details concerning how target computer 16 performs this measurement are discussed below with respect to FIG. 2.

Figure 2:
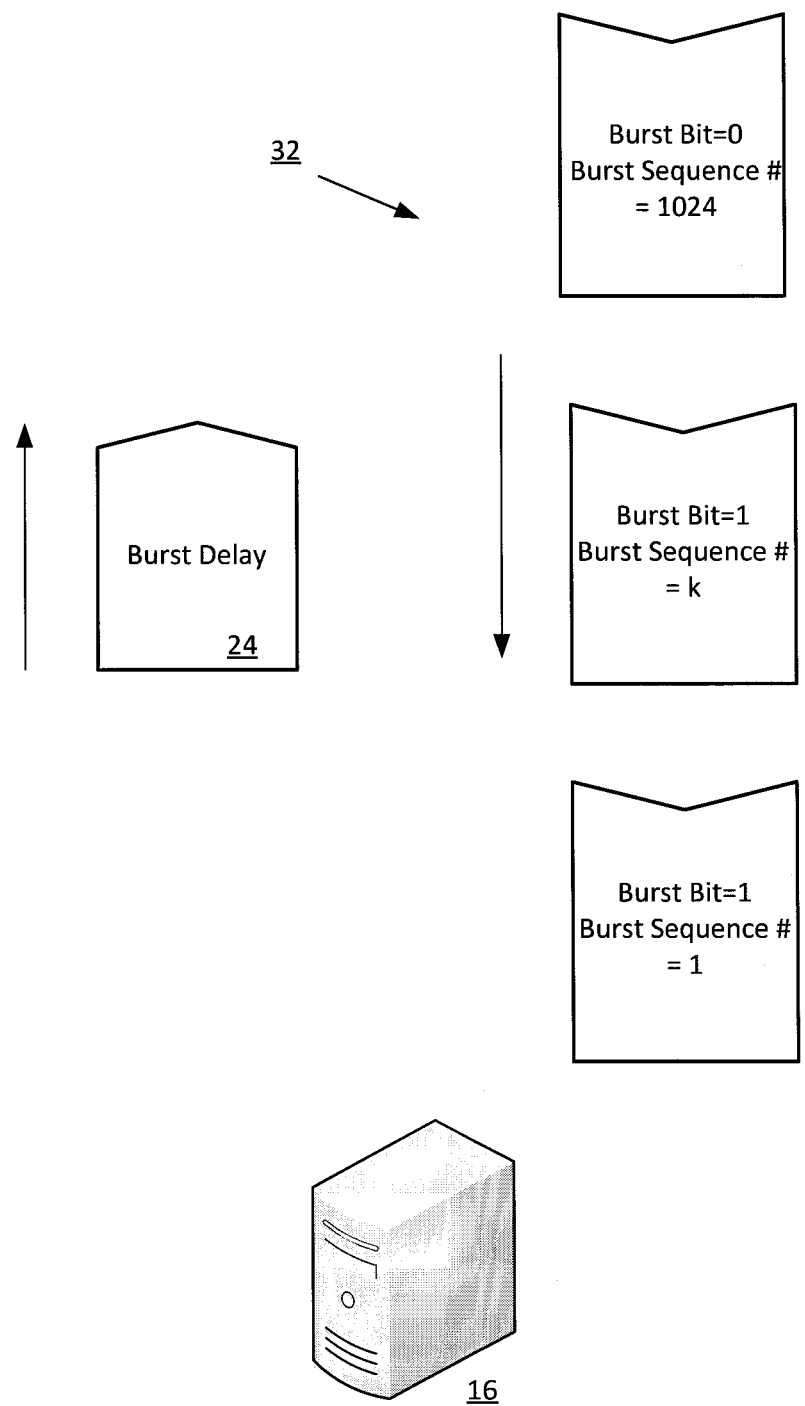
FIG. 2 is a block diagram illustrating example burst datagrams within the electronic environment shown in FIG. 1.

FIG. 2 illustrates burst 32 as sent to target computer 16. Data transmission computer 14 writes information in a header in each datagram regarding burst 32. In this case, data transmission computer 14 writes a burst bit value whose default value is "0" and a burst sequence number. For example, in leading datagram 34, data transmission computer 14 writes a "1" for the value of the burst bit to signify that a burst is beginning Leading datagram has a burst sequence number of 1 as it is the first datagram in the burst. In the case illustrated in FIG. 2, burst 32 has 1024 datagrams; in other arrangements, burst 32 may have any number of datagrams from a dozen to about 100,000 datagrams. Thus, trailing datagram 36 has a burst sequence number of 1024. In this case, trailing datagram 32 has its burst bit value set to "0" to signify the end of burst 32; in some arrangements, however, the burst bit is set to "0" in the datagram after trailing datagram 36.

Target computer 16, upon receiving leading datagram 36 of burst 32, reads the burst bit value of "1" and is configured to record the time at which leading datagram 36 is received. Target computer 16 then examines datagrams 36 of burst 32 until it sees the bit value of "0" in a header; this will be trailing datagram 36. Target computer 16 then records the time at which trailing datagram 36 was received, and also extracts the burst sequence number (1024) from its header. Target computer 16 then computes the burst delay as the difference between the time at which trailing datagram 36 was received and the time at which leading datagram 34 was received, divided by 1024, the number of datagrams in burst 32. Target computer 16 then writes this burst delay in the header of a response 24(2) to probing datagram 22(2).

Upon receiving the response 22(2), data transmission computer 14 extracts the burst delay (BD) and, along with the computed RTT (or RTTf, or dRTTF), computes the new transmission rate. It should be understood that data transmission computer 14 may also perform filtering operations on the burst delay; such filtering will be discussed below with respect to FIG. 4.

Further details of data transmission computer 14 are described below with respect to FIG. 3.

Figure 3:
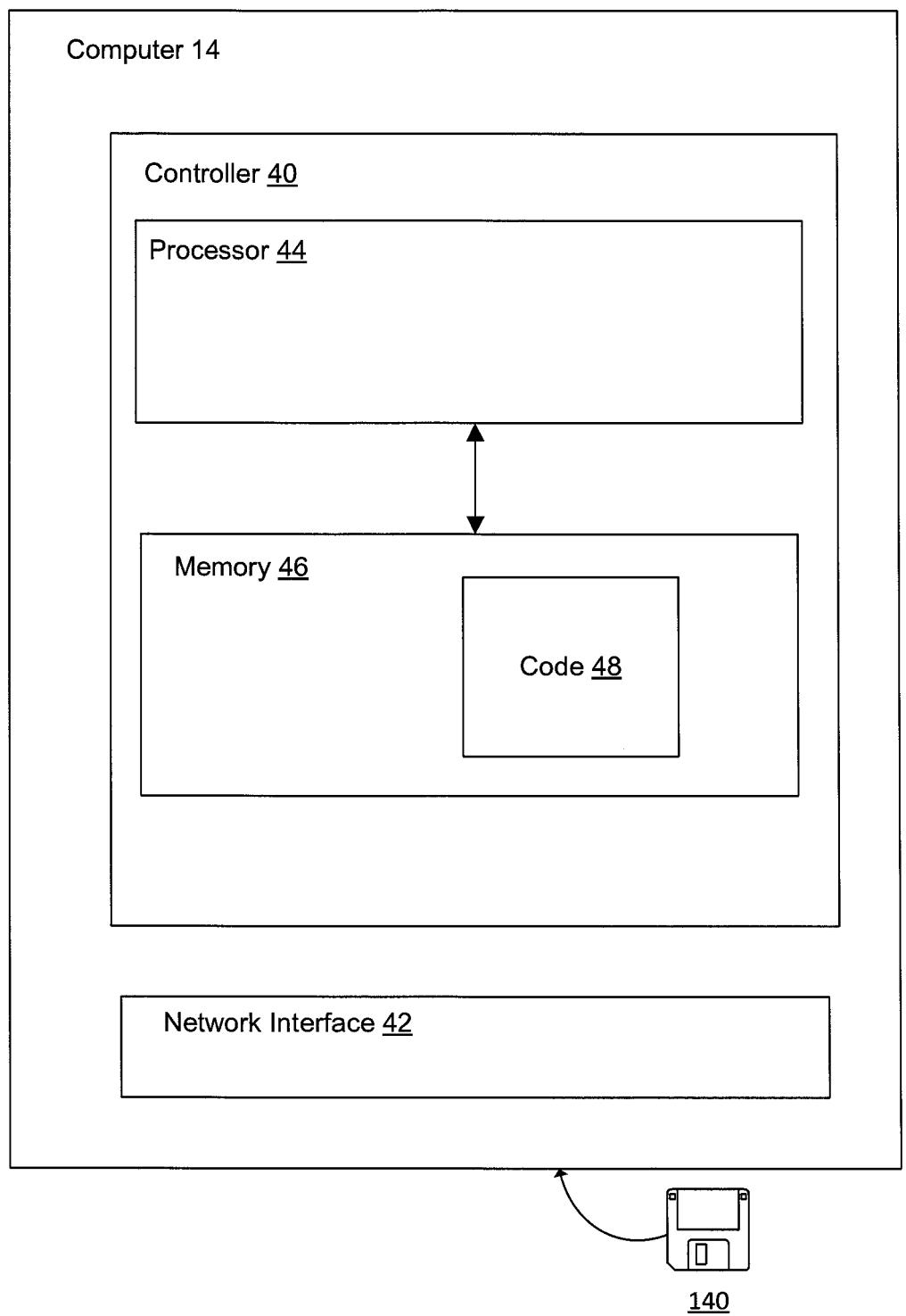
FIG. 3 is a block diagram illustrating an example data transmitting computer within the electronic environment shown in FIG. 1.

FIG. 3 illustrates details of an example data transmission computer 14. Data transmission computer 14 includes controller 40, which in turn includes processor 44 and memory 46, and network interface 42.

Network interface 42 takes the form of an Ethernet card; in some arrangements, network interface 42 may take other forms including a wireless receiver or a token ring card.

Memory 46 is configured to store code 48 that contains instructions configured to cause the processor to carry out the improved technique. Memory 46 generally takes the form of, e.g., random access memory, flash memory or a non-volatile memory or a combination thereof.

Processor 44 takes the form of, but is not limited to, Intel or AMD-based MPUs, and can include a single-core or multi-cores each running single or multiple threads. In some arrangements, processor 44 is one of several processors working together.

Processor 44 is configured to carry out operations related to determining transmission rates based on RTT and, in some arrangements, BD. These operations are described in detail below with respect to FIG. 3.

Figure 4:
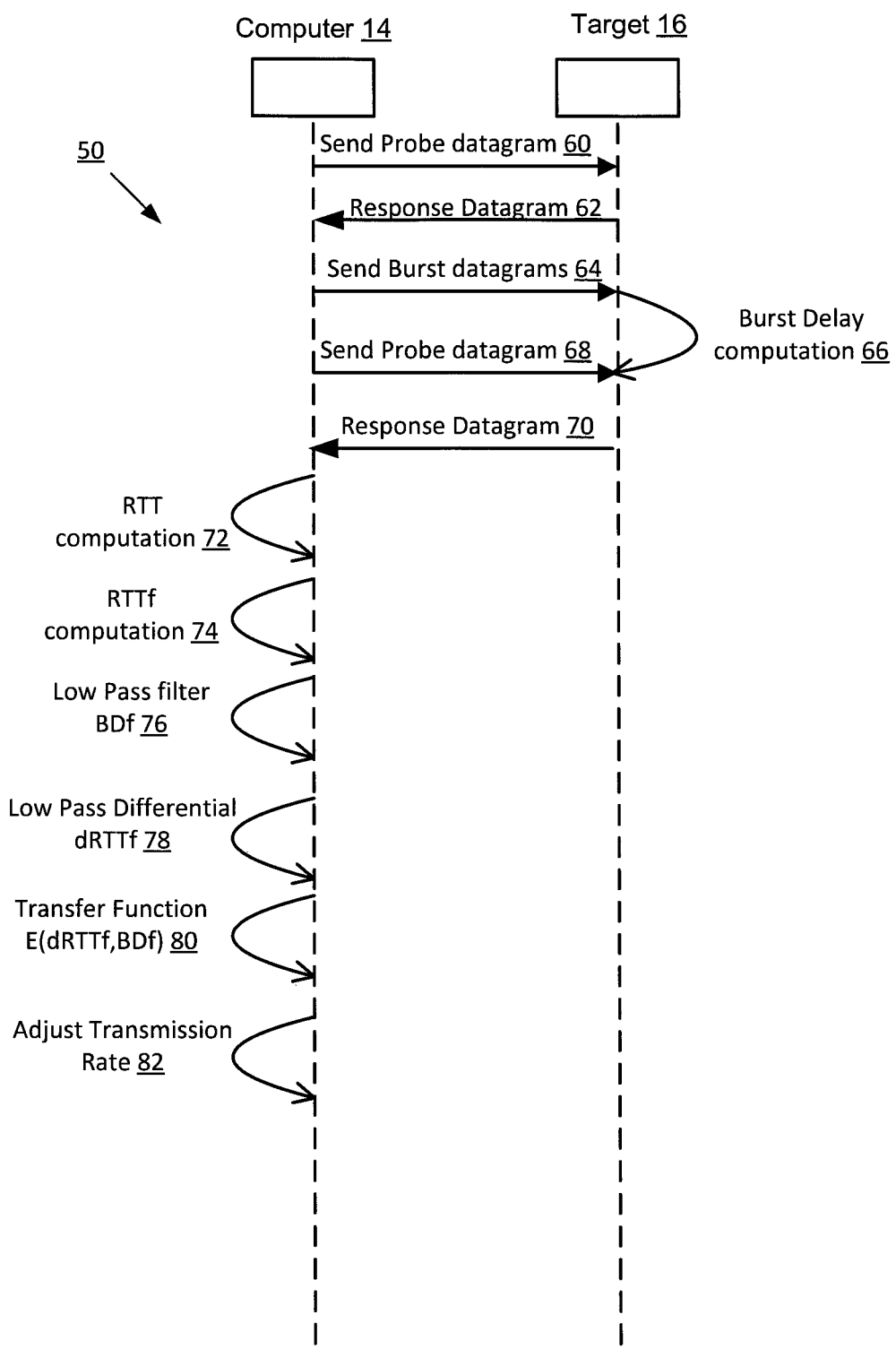
FIG. 4 is a sequence diagram illustrating an example transmission rate adjustment operation within the electronic system shown in FIG. 1.

FIG. 4 is a sequence diagram illustrating an example process 50 of adjusting a transmission rate carried out by processor 44 according to the improved technique. The process 50 shows how processor 44 determines the rate at which datagrams are sent out to destination server 18 in order to avoid network congestion.

Processor 44 begins (step 60) by sending probe datagrams 22(1) (see FIG. 1) to target 16 at a first transmission rate. As discussed above in connection with FIG. 1, probe 22(1) has instructions to request target 16 to send (step 62) a response 24 (see FIG. 1) back to data transmission computer 14, as well as the sending time 28 at which probing datagram 22(1) was sent.

Processor 44 then, sometime later, sends (step 64) burst 32 to target computer 16. As discussed above in connection with FIG. 2, processor 44 writes information in the header of each burst datagram that identifies that datagram as part of a burst to be measured. The information includes a value of a burst bit of "1" (which is "0" by default) and a burst sequence number.

Target computer 16 receives burst 32. Target computer 16 is configured to read headers of each datagram it receives and is further configured to identify burst 32 by observing the change in value of the burst bit from "0" to "1". When the value of the burst bit changes, target computer 16 records the time at which it receives leading datagram 34. When the value of the burst bit changes back to "0" from "1", target computer 16 observes the time at which trailing datagram 36 was received and extracts the burst sequence number from the header of trailing datagram 36. Target computer 16 then computes (step 66) the burst delay as the difference between the times at which trailing datagram 36 and leading datagram were received, divided by number of datagrams in burst 36.

Processor 44 sends (step 68) probe datagram 22(2) to target computer 16. Upon receipt of probe datagram 22(2), target computer 16 writes the burst delay it computed into the header of response datagram 24(2) it issues corresponding to probe datagram 22(2).

Processor 44 (step 70) receives response 24(2) from target 16 and measures receiving time 30 at which response datagram 24(1) was received. Processor 44 computes (step 72) the RTT from the receiving time 30 and the sending time 28 from the header of response 24(1). It should be understood that target computer 16 had written sending time 28 to a header of response 24(1).

Processor 44 places (step 74) this RTT value into a buffer of fixed size in memory 46 in which other, previous values of RTT are stored. In placing this value into the buffer, processor 44 removes the oldest value from the buffer. Processor 44 then sorts the largest half of the RTT values in the buffer; the smallest of these is the median value RTTf.

Processor performs a low-pass filtering operation (step 76) on the burst delay. This involves performing a weighted average of the burst delay and a previous value of the burst delay. Practically, the filtered burst delay $BDf=\alpha BD_{new}+(1-\alpha) BD_{old}$, where $\alpha$ is a weight parameter and is typically about 0.01, but can be 0.001, 0.002, 0.005, 0.02, 0.05, 0.1, and so on.

Processor 44 then (step 78) compares the computed value of RTTf to a minimum value of RTT mRTT, which is initially set to MAX_INT (i.e., $2^{31}1$, or 2,147,483,647). Processor 44 computes the difference dRTTf=RTTf–mRTT. If the computed value of the RTTf is less than mRTT, then processor 44 replaces the value of mRTT in memory 46 with the computed value of RTTf. In some arrangements, processor 44 performs a low-pass filtering operation on dRTTf similar to that for the burst delay above.

It should be understood that some of the datagrams 22 or responses 24 in the burst may have been dropped. It should be clear from the above description that such a loss of datagrams in the burst is not an indicator of congestion in this application.

Processor 44 then uses the values of dRTTf and BDf to compute (step 80) a transfer function which represents a scale factor to obtain the new rate of transmission. Processor 44 uses the following transfer function:

$$E(dRTTf, BDf) = \frac{\log\left(\frac{dRTTf}{K_1}\right)}{\log\left(\frac{BDf}{K_2}\right)}$$

where $K_1$ and $K_2$ are positive numbers. Preferably, $K_1$=10 and $K_2$=1. Note that the only specification on the base of the logarithm is that the bases of both logarithms be the same; otherwise, that base is unimportant. Practically, processor 44 computes natural logarithms (i.e., base e).

Once processor 44 computes E, processor 44 then computes (in step 82) the new transmission rate from the following relation:

$$T_{new} = E(dRTTf, BDf)BDf$$

$T_{new}$ is the new rate of transmission. Having adjusted the rate of transmission thusly, processor 44 is now configured to send payload datagrams at the new rate of transmission.

It should be understood that processor 44 continues to send probe datagrams 22 to target server 16 in order to compute new values of dRTTf. Periodically, say, 4 per minute, processor 44 computes a new value of E and, thereby, a new rate of transmission based on new values of dRTTf.

Figure 5:
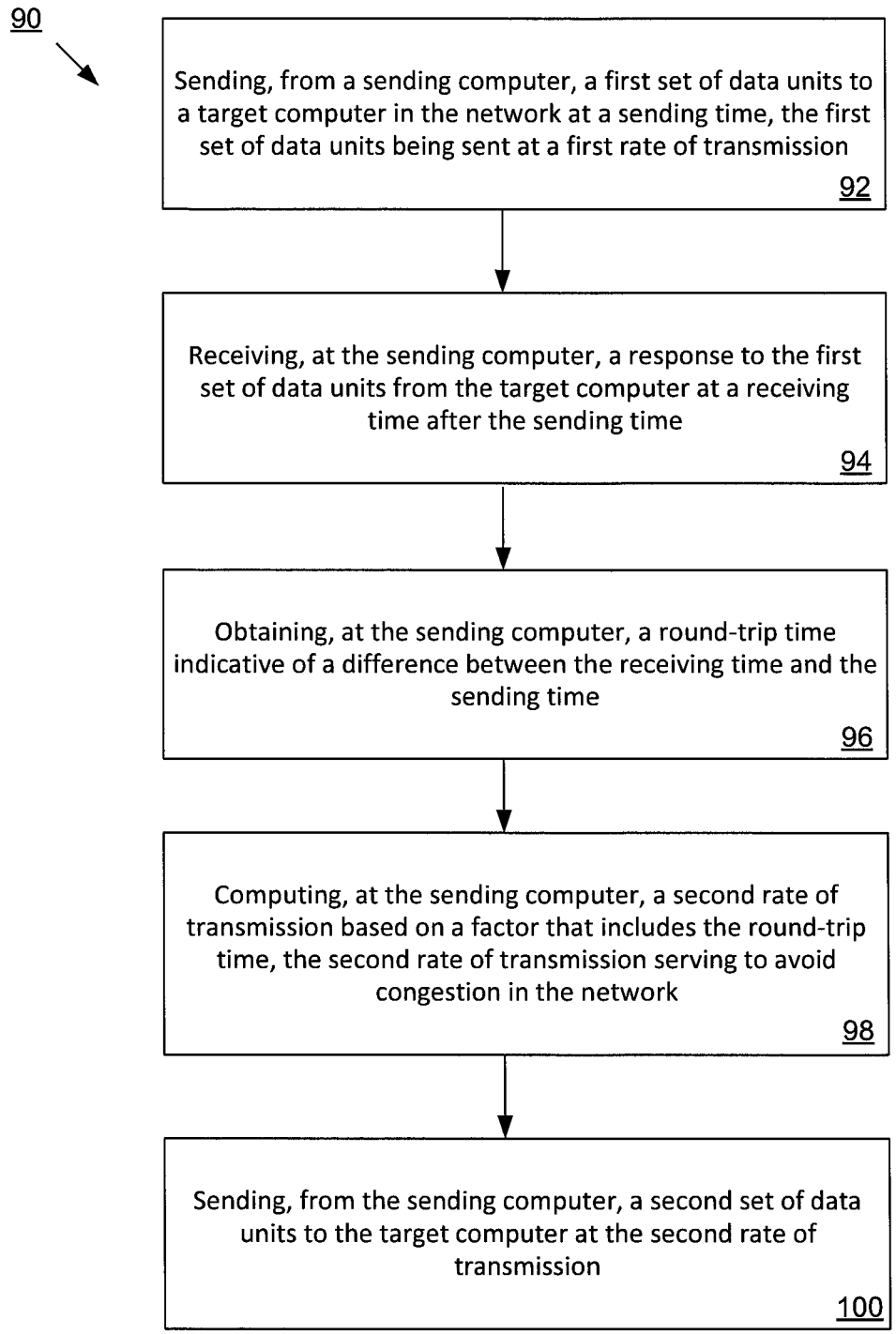
FIG. 5 is a flow chart illustrating an example method of carrying out the improved technique within the electronic environment shown in FIG. 1.

FIG. 5 illustrates a method 90 of avoiding congestion in a network according to the improved technique, including steps 92, 94, 96, 98, and 100. In step 92, a first set of data units is sent to a target computer in the network at a sending time, the first set of data units being sent at a first rate of transmission. In step 94, a response to the first set of data units is received from the target computer at a receiving time after the sending time. In step 96, a round-trip time indicative of a difference between the receiving time and the sending time is obtained. In step 98, a second rate of transmission is obtained based on a factor that includes the round-trip time, the second rate of transmission serving to avoid congestion in the network. In step 100, a second set of data units is sent to the target computer at the second rate of transmission.

While various embodiments of the invention have been particularly shown and described, it will be understood by those skilled in the art that various changes in form and details may be made therein without departing from the spirit and scope of the invention as defined by the appended claims.

For example, while the above examples discussed datagrams sent using UDP, the improved technique applies to other protocols such as IP and the like.

Furthermore, it should be understood that some embodiments are directed to data transmission computer 14, which is constructed and arranged to avoid congestion in a network. Some embodiments are directed to a process of avoiding congestion in a network. Also, some embodiments are directed to a computer program product which enables computer logic to avoid congestion in a network.

In some arrangements, data transmission computer 14 is implemented by a set of processors or other types of control/processing circuitry running software. In such arrangements, the software instructions can be delivered, within data transmission computer 14, either in the form of a computer program product 140 (see FIG. 2) or simply instructions on disk or in pre-loaded in memory 46 of data transmission computer 14, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of avoiding congestion in a network, the method comprising:

sending, from a sending computer, a first set of data units to a target computer in the network at a sending time, the first set of data units being sent at a first rate of transmission;

receiving, at the sending computer, a response to the first set of data units from the target computer at a receiving time after the sending time;

obtaining, at the sending computer, a round-trip time indicative of a difference between the receiving time and the sending time;

computing, at the sending computer, a second rate of transmission based on a factor that includes the round-trip time, the second rate of transmission serving to avoid congestion in the network; and sending, from the sending computer, a second set of data units to the target computer at the second rate of transmission;

wherein the network uses a user datagram protocol (UDP);

wherein a data unit of the first set of data units is a probing datagram having a header in which a destination of the probing datagram is indicated, and the response is a response datagram having a header;

wherein the method further comprises:

prior to sending the second set of data units, sending, from the sending computer, a burst of datagrams to the receiving computer, the burst of datagrams including a number of datagrams, a leading datagram, and a trailing datagram;

wherein receiving the response to the first set of data units from the target computer includes extracting a burst delay from the header of the response datagram, the burst delay being indicative of a difference in a receiving time of the leading datagram of the burst of datagrams at the target computer and a receiving time of the trialing datagram of the burst of datagrams at the target computer, that difference being divided by the number of datagrams of the burst of datagrams to produce the burst delay, the burst delay having been written to the header of the response datagram by the target computer prior to sending the response datagram to the sending computer;

wherein computing the second rate of transmission based on the factor that includes the round-trip time includes generating the second rate of transmission based on another factor that includes the burst delay.

2. The method as in claim 1,
wherein the target computer is configured to send the response datagram to the sending computer upon receipt of the datagram; and
wherein sending the first set of data units includes:
indicating, in the header of the probing datagram, the sending time;
wherein obtaining the round trip time includes:
extracting the sending time from the header of the response datagram.

3. The method as in claim 2,
wherein obtaining the round-trip time further includes:
comparing the difference to a minimum round-trip time stored in a particular location in memory in the sending computer,
when the difference is smaller than the minimum round-trip time, storing the difference in the particular location in memory.

4. The method as in claim 3,
wherein obtaining the round-trip time further includes:
storing the difference in a buffer of fixed size in the sending computer, the buffer of fixed size containing, after storing the difference, differences including prior differences and the difference, and
computing a differential round-trip time defined as a difference between a median of the differences stored in the buffer and the minimum round-trip time, the factor including the differential round trip time.

5. The method as in claim 1, further comprising:
producing, as the burst delay, a weighted average of the burst delay received in the response datagram and a prior burst delay stored in another location in memory in the sending computer.

6. The method as in claim 5:
wherein computing the differential round trip time includes:
generating, as the differential round trip time, the weighted average differential round trip time and another differential round-trip time computed at a time prior to the receiving time.

7. The method as in claim 1,
wherein generating the second rate of transmission further includes:
producing a transfer function based on the differential round-trip time and the burst delay, the transfer function serving as a measure of congestion in the network; and
forming, as the second rate of transmission, a product of the transfer function and the burst delay.

8. The method as in claim 7,
wherein producing the transfer function includes:
producing, as a transfer function numerator, a logarithm of a product of a first scale factor and the differential round-trip time;
producing, as a transfer function denominator, a logarithm of a product of a second scale factor and the burst delay; and
forming a ratio of the transfer function numerator to the transfer function denominator.

9. The method as in claim 1,
wherein computing the second rate of transmission further includes:
generating a transfer speed based on a number of bytes transferred in a burst divided by the burst delay, the transfer speed being indicative of the congestion in the network.

10. An apparatus constructed and arranged to avoid congestion in a network, the apparatus comprising:
a network interface;
memory; and
a controller including controlling circuitry constructed and arranged to:
send, a first set of data units to a target computer in the network at a sending time, the first set of data units being sent at a first rate of transmission;
receive, a response to the first set of data units from the target computer at a receiving time after the sending time;
obtain, a round-trip time indicative of a difference between the receiving time and the sending time;
compute, a second rate of transmission based on a factor that includes the round-trip time, the second rate of transmission serving to avoid congestion in the network; and send, a second set of data units to the target computer at the second rate of transmission;
wherein the network uses a user datagram protocol (UDP);
wherein a data unit of the first set of data units is a probing datagram having a header in which a destination of the probing datagram is indicated, and the response is a response datagram having a header;
wherein the method further comprises:
prior to sending the second set of data units, sending, from the sending computer, a burst of datagrams to the receiving computer, the burst of datagrams including a number of datagrams, a leading datagram, and a trailing datagram;
wherein receiving the response to the first set of data units from the target computer includes extracting a burst delay from the header of the response datagram, the burst delay being indicative of a difference in a receiving time of the leading datagram of the burst of datagrams at the target computer and a receiving time of the trialing datagram of the burst of datagrams at the target computer, that difference being divided by the number of datagrams of the burst of datagrams to produce the burst delay, the burst delay having been written to the header of the response datagram by the target computer prior to sending the response datagram to the sending computer;
wherein computing the second rate of transmission based on the factor that includes the round-trip time includes generating the second rate of transmission based on another factor that includes the burst delay.

11. The apparatus as in claim 10,
wherein the target computer is configured to send the response datagram to the sending computer upon receipt of the datagram; and
wherein sending the first set of data units includes:
indicating, in the header of the probing datagram, the sending time;
wherein obtaining the round trip time includes:
extracting the sending time from the header of the response datagram.

12. The apparatus as in claim 11,
wherein obtaining the round-trip time further includes:
comparing the difference to a minimum round-trip time stored in a particular location in memory in the sending computer, when the difference is smaller than the minimum round-trip time, storing the difference in the particular location in memory.

13. The apparatus as in claim 12,
wherein obtaining the round-trip time further includes:
storing the difference in a buffer of fixed size in the sending computer, the buffer of fixed size containing, after storing the difference, differences including prior differences and the difference, and
computing a differential round-trip time defined as a difference between a median of the differences stored in the buffer and the minimum round-trip time, the factor including the differential round trip time.

14. The apparatus as in claim 10, wherein the controlling circuitry is further constructed and arranged to:
produce, as the burst delay, a weighted average of the burst delay received in the response datagram and a prior burst delay stored in another location in memory in the sending computer.

15. The apparatus as in claim 14:
wherein computing the differential round trip time includes:
generating, as the differential round trip time, the weighted average differential round trip time and another differential round-trip time computed at a time prior to the receiving time.

16. The apparatus as in claim 10, wherein generating the second rate of transmission further includes:
producing a transfer function based on the differential round-trip time and the burst delay, the transfer function serving as a measure of congestion in the network; and
forming, as the second rate of transmission, a product of the transfer function and the burst delay.

17. The apparatus as in claim 16,
wherein producing the transfer function includes:
producing, as a transfer function numerator, a logarithm of a product of a first scale factor and the differential round-trip time;
producing, as a transfer function denominator, a logarithm of a product of a second scale factor and the burst delay; and
forming a ratio of the transfer function numerator to the transfer function denominator.

18. A computer program product having a non-transitory, computer-readable storage medium which stores code for avoiding congestion in a network, the code including instructions which, when executed by a computer, causes the computer to:

send a first set of data units to a target computer in the network at a sending time, the first set of data units being sent at a first rate of transmission;
receive a response to the first set of data units from the target computer at a receiving time after the sending time;
obtain a round-trip time indicative of a difference between the receiving time and the sending time;
compute a second rate of transmission based on a factor that includes the round-trip time, the second rate of transmission serving to avoid congestion in the network; and
send a second set of data units to the target computer at the second rate of transmission;
wherein the network uses a user datagram protocol (UDP);
wherein a data unit of the first set of data units is a probing datagram having a header in which a destination of the probing datagram is indicated, and the response is a response datagram having a header;
wherein the method further comprises:
prior to sending the second set of data units, sending, from the sending computer, a burst of datagrams to the receiving computer, the burst of datagrams including a number of datagrams, a leading datagram, and a trailing datagram;
wherein receiving the response to the first set of data units from the target computer includes extracting a burst delay from the header of the response datagram, the burst delay being indicative of a difference in a receiving time of the leading datagram of the burst of datagrams at the target computer and a receiving time of the trialing datagram of the burst of datagrams at the target computer, that difference being divided by the number of datagrams of the burst of datagrams to produce the burst delay, the burst delay having been written to the header of the response datagram by the target computer prior to sending the response datagram to the sending computer;
wherein computing the second rate of transmission based on the factor that includes the round-trip time includes generating the second rate of transmission based on another factor that includes the burst delay.

\* \* \* \* \*